United States Patent
Hu et al.

(10) Patent No.: US 11,397,483 B2
(45) Date of Patent: Jul. 26, 2022

(54) TOUCH PANEL, MANUFACTURING METHOD THEREOF, AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Haifeng Hu, Beijing (CN); Ming Zhang, Beijing (CN); Zhanqi Xu, Beijing (CN); Ting Zeng, Beijing (CN); Cui Chen, Beijing (CN); Liuyue Yin, Beijing (CN); Zhi Du, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 683 days.

(21) Appl. No.: 16/329,310

(22) PCT Filed: Jun. 12, 2018

(86) PCT No.: PCT/CN2018/090890
§ 371 (c)(1),
(2) Date: Feb. 28, 2019

(87) PCT Pub. No.: WO2019/056809
PCT Pub. Date: Mar. 28, 2019

(65) Prior Publication Data
US 2021/0357049 A1    Nov. 18, 2021

(30) Foreign Application Priority Data
Sep. 20, 2017    (CN) .......................... 201710851303.8

(51) Int. Cl.
*G06F 3/041*    (2006.01)
*G06F 3/044*    (2006.01)

(52) U.S. Cl.
CPC .......... *G06F 3/0412* (2013.01); *G06F 3/0446* (2019.05); *G06F 3/04164* (2019.05); *G06F 2203/04103* (2013.01)

(58) Field of Classification Search
None
See application file for complete search history.

(56) References Cited

U.S. PATENT DOCUMENTS

| 2011/0227848 A1* | 9/2011 | Furusawa | G06F 1/1626 345/173 |
| 2011/0242020 A1* | 10/2011 | Kang | G06F 3/0443 345/173 |

(Continued)

FOREIGN PATENT DOCUMENTS

| CN | 103396012 A | 11/2013 |
| CN | 103425372 A | 12/2013 |

(Continued)

OTHER PUBLICATIONS

Search Report and Written Opinion for International Application No. PCT/CN2018/090890 dated Sep. 7, 2018.

*Primary Examiner* — Krishna P Neupane
(74) *Attorney, Agent, or Firm* — Calfee, Halter & Griswold LLP

(57) ABSTRACT

A touch panel, a manufacturing method thereof, and a display device are provided, and relates to the field of display technology. The touch panel includes a display area and a non-display area. The touch panel further includes: a base substrate; a metal bezel disposed above the base substrate and located in the non-display area; a transparent protective layer disposed above the metal bezel; and a touch function layer disposed above the transparent protective (Continued)

layer; wherein a side where the base substrate is located is a display side of the touch panel.

20 Claims, 9 Drawing Sheets

(56) References Cited

U.S. PATENT DOCUMENTS

| | | | |
|---|---|---|---|
| 2013/0002133 A1* | 1/2013 | Jin | G06F 1/1626 |
| | | | 313/511 |
| 2015/0047885 A1 | 2/2015 | Chang et al. | |
| 2015/0077384 A1* | 3/2015 | Hong | G06F 3/04164 |
| | | | 345/174 |
| 2018/0146564 A1* | 5/2018 | Wang | G02B 5/003 |
| 2018/0348925 A1* | 12/2018 | Wang | G02F 1/133308 |

FOREIGN PATENT DOCUMENTS

| | | |
|---|---|---|
| CN | 104376898 A | 2/2015 |
| CN | 104866127 A | 8/2015 |
| CN | 106249979 A | 12/2016 |
| CN | 107656640 A | 2/2018 |
| TW | M491213 U | 12/2014 |
| TW | 201508826 A | 3/2015 |
| TW | 201533640 A | 9/2015 |
| WO | 2018040712 A1 | 3/2018 |

\* cited by examiner

TOUCH PANEL, MANUFACTURING METHOD THEREOF, AND DISPLAY DEVICE

CROSS REFERENCE TO RELATED APPLICATIONS

The present application is based upon International Application No. PCT/CN2018/090890, filed on Jun. 12, 2018, which claims priority of Chinese patent application No. 201710851303.8, filed on Sep. 20, 2017, the entire disclosure of which is hereby incorporated by reference as a part of the present application.

TECHNICAL FIELD

The present disclosure relates to the field of display technology, and more particularly to a touch panel, a manufacturing method thereof, and a display device.

BACKGROUND

With the continuous development of touch technology, display devices with touch functions have come into in all aspects of daily lives, especially the application of handheld mobile devices such as smart phones, and functionality and appearance requirements on handheld mobile devices from users are getting higher and higher.

It should be noted that the information disclosed in the Background section above is only for enhancement of understanding of the background of the present disclosure, and thus may include information that does not constitute prior art known to those of ordinary skill in the art.

SUMMARY

According to one aspect of the present disclosure, there is provided a touch panel, including a display area and non-display area. The touch panel further includes:
a base substrate;
a metal bezel disposed above the base substrate and located in the non-display area;
a transparent protective layer disposed above the metal bezel; and
a touch function layer disposed above the transparent protective layer; and
wherein a side where the base substrate is located is a display side of the touch panel.

In an exemplary embodiment of the present disclosure, the touch panel further includes:
a light shielding layer disposed on a side of the metal bezel facing away from the base substrate;
wherein an orthographic projection of the light shielding layer on the base substrate coincides with an orthographic projection of the metal bezel on the base substrate.

In an exemplary embodiment of the present disclosure, the material for forming the metal bezel includes one or more of copper, aluminum, gold, silver, and molybdenum.

In an exemplary embodiment of the present disclosure, the material for forming the transparent protective layer is an acid resistant insulating material.

In an exemplary embodiment of the present disclosure, the touch function layer includes a touch electrode located in the display area;
the touch electrode includes a first electrode arranged in a first direction and a second electrode arranged in a second direction, and the first electrode and the second electrode are electrically insulated from each other; and
wherein the first direction and the second direction are at an angle of 60°-90° with respect to each other.

In an exemplary embodiment of the present disclosure, the first electrode includes a plurality of electrically connected first block electrodes, and adjacent first block electrodes are connected by a conductive strip of an integral form;
the second electrode includes a plurality of electrically connected second block electrodes, and adjacent second block electrodes are connected by a conductive bridge at a different layer; and
the first block electrode and the second block electrode are disposed in the same layer, and an insulating layer is further disposed between the first and second block electrodes and the conductive bridge.

In an exemplary embodiment of the present disclosure, the touch function layer further includes a circuit connection structure located in the non-display area; and
the circuit connection structure includes a conductive block disposed in the same layer as the second block electrode and formed of the same material as the second block electrode, and a metal wire electrically connected to the conductive block.

In an exemplary embodiment of the present disclosure, the metal wire is disposed in the same layer as the conductive bridge and is formed of the same material as the conductive bridge.

In an exemplary embodiment of the present disclosure, the first electrode is a first strip electrode, the second electrode is a second strip electrode, and an insulating layer is disposed between the first strip electrode and the second strip electrode.

According to one aspect of the present disclosure, there is provided a method for manufacturing a touch panel, including:
forming a metal bezel on a non-display area above a base substrate;
forming a transparent protective layer over the metal bezel; and
forming a touch function layer over the transparent protective layer;
wherein a side where the base substrate is located is a display side of the touch panel.

In an exemplary embodiment of the present disclosure, the method further includes:
depositing a metal layer on the substrate; and
patterning the metal layer to obtain a desired metal bezel, wherein the metal layer includes an alloy of a combination of any one or more of copper, aluminum, silver, and molybdenum.

In an exemplary embodiment of the present disclosure, the method further includes:
coating a layer of black photoresist on the substrate formed with the metal bezel;
and
patterning the black photoresist to obtain a light shielding layer, wherein the light shielding layer and the metal bezel together form a composite bezel.

In an exemplary embodiment of the present disclosure, the method further includes:
depositing a transparent protective layer on the substrate on which the light shielding layer has been formed, and the transparent protective layer includes an acid resistant insulating material.

In an exemplary embodiment of the present disclosure, the method further includes:

depositing an ITO film on the substrate on which the transparent protective layer has been formed; and patterning the ITO film to obtain a plurality of first block electrodes electrically connected by conductive strips and a plurality of independent second block electrodes in a display area, and to obtain a conductive block in the non-display area, wherein the conductive strip and the first block electrode form the first electrode, thereby obtaining an ITO pattern of a touch electrode.

In an exemplary embodiment of the present disclosure, the method further includes:

coating an organic transparent insulating layer on the substrate on which the ITO pattern has been formed; and patterning the organic transparent insulating layer to obtain a pattern of a first organic transparent insulating layer, wherein the first organic transparent insulating layer covers above the first electrode in the display area and above a part of the conductive block in the non-display area, to obtain a first insulating layer pattern.

In an exemplary embodiment of the present disclosure, the method further includes:

depositing a metal film on the substrate on which the first insulating layer pattern has been formed; and patterning the metal film to obtain a conductive bridge bridging the second block electrodes in the display area, and to obtain a metal wire lapping on the conductive block in the non-display area, thereby obtaining a complete metal trace and bridge pattern.

In an exemplary embodiment of the present disclosure, the method further includes:

coating a second organic transparent insulating layer on the substrate on which the metal trace and the bridge pattern has been formed; and patterning the second organic transparent insulating layer to obtain a second organic transparent insulating layer covering the conductive bridge and the metal wire.

In an exemplary embodiment of the present disclosure, the base substrate includes a glass substrate or a flexible substrate.

According to one aspect of the present disclosure, there is provided a display device including the touch panel described above and a display module.

It should be understood that the above general description and the following detailed description are intended to be illustrative and not restrictive.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that the drawings in the following description are only some of the embodiments of the present disclosure, and other drawings may be obtained by those skilled in the art from these drawings without paying creative effort.

DETAILED DESCRIPTION

Figure 1:
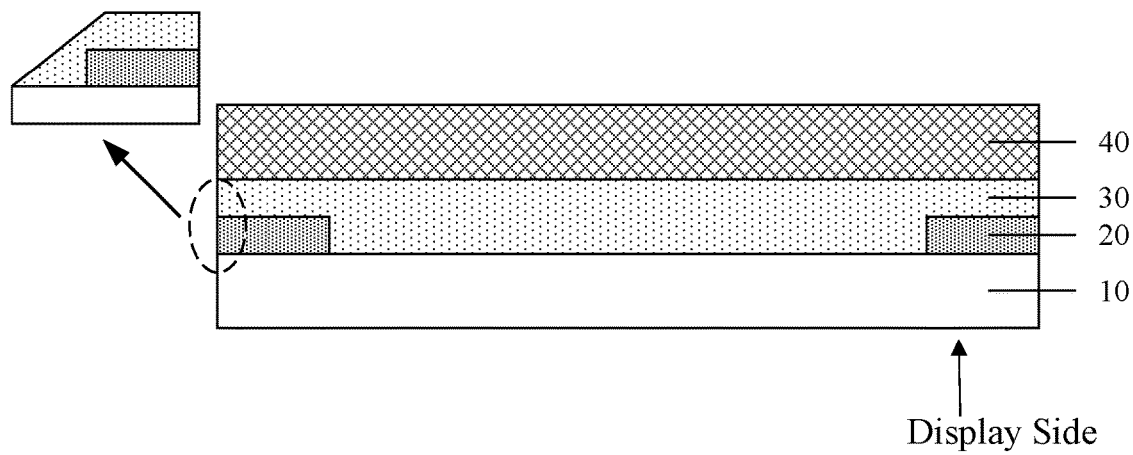
FIG. 1 is a first schematic structural diagram of a touch panel according to an exemplary embodiment of the present disclosure.

Exemplary embodiments will now be described more fully with reference to the accompanying drawings. However, the exemplary embodiments can be embodied in a variety of forms and should not be construed as being limited to the examples set forth herein; rather, these embodiments are provided to make the present disclosure to be more complete and thorough, to fully convey the concept of the exemplary embodiments to those skilled in the art. The described features, structures, or characteristics may be combined in any suitable manner in one or more embodiments. In the following description, numerous specific details are set forth to provide a thorough understanding of the embodiments of the present disclosure. However, one skilled in the art will appreciate that one or more of the specific details may be omitted or other methods, components, devices, steps, etc. may be employed. In other instances, well-known technical solutions are not shown or described in detail to avoid obscuring aspects of the present disclosure.

In addition, the drawings are merely schematic representations of the present disclosure and are not necessarily drawn to scale. The thicknesses and shapes of the various layers in the drawings do not reflect true proportions, only for the purpose of illustrating the contents of the present disclosure. The same reference numerals in the drawings denote the same or similar parts, and the repeated description thereof will be omitted.

The exemplary embodiment provides a touch panel including a display area and a non-display area. As shown in FIG. 1, the touch panel may include:

a base substrate 10;

a metal bezel 20 disposed above the base substrate 10 and located in the non-display area;

a transparent protective layer 30 disposed above the metal bezel 20; and a touch function layer 40 disposed above the transparent protective layer 30, wherein a side where the base substrate 10 is located is the display side of the touch panel.

It should be noted that the touch function layer 40 does not necessarily refer to a single-layer film structure, but may include a multi-layer structure capable of implementing a touch function.

In the touch panel provided by the exemplary embodiment of the present disclosure, by providing a metal layer as a bezel on the inner surface of the base substrate 10, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the basis of this, by providing the transparent protective layer 30 above the metal bezel 20, the metal bezel 20 can be prevented from being eroded by etching liquid, thereby effectively avoiding missing marks required in the subsequent process.

Figure 2:
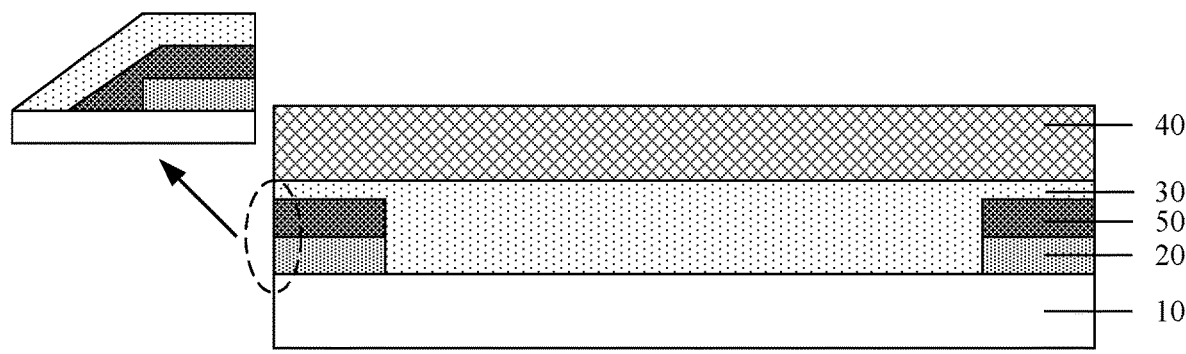
FIG. 2 is a second schematic structural diagram of a touch panel according to an exemplary embodiment of the present disclosure.

In the exemplary embodiment, as shown in FIG. 2, the touch panel may further include a light shielding layer 50 disposed on a side of the metal bezel 20 facing away from the base substrate 10, and an orthographic projection of the light shielding layer 50 on the base substrate 10 coincides with an orthographic projection of the metal bezel 20 on the base substrate 10, and the patterns of the two are completely identical.

The light shielding layer 50 can be made of a material of general black matrix (BM). Since the metal bezel 20 is further disposed between the base substrate 10 and the light shielding layer 50, the adhesion of the light shielding layer 50 can be effectively improved, thereby preventing the light shielding layer 50 from exhibiting poor adhesion in the UV resistance test.

Based on this, the present exemplary embodiment provides a touch panel with a double-layer bezel structure. Since the metal bezel 20 is disposed between the base substrate 10 and the light shielding layer 50, the bezel presented to the user is still a metal bezel, which can be realized rich color design.

It should be noted that, in the touch panel shown in FIG. 2, since there is provided a light shielding layer 50, a black contour is inevitably generated at the edge climbing position, and the black contour may affect the visual effect of pure metal bezel to a certain extent. In the touch panel shown in FIG. 1, by eliminating the light shielding layer 50, a perfect pure metal bezel can be realized, thereby satisfying the user's demand for visual aesthetics of the product.

In the present exemplary embodiment, the base substrate 10 may be a glass substrate or a flexible substrate such as a PET (poly(ethylene terephthalate), polyethylene terephthalate) substrate, and the type of the base substrate 10 is not specifically limited herein.

In the present exemplary embodiment, the material for forming the metal bezel 20 may be a metal or an alloy including, but not limited to, one or more of copper, aluminum, gold, silver, and molybdenum. In this way, the resulted touch panel can realize different colors such as mirror silver or bronze metal bezel, thereby enhancing the competitiveness of the product.

In the present exemplary embodiment, the material for forming the transparent protective layer 30 may be any one of an acid-resistant insulating material such as silicon oxide, silicon nitride, or silicon oxynitride. Since etching liquid is mostly an acidic etching liquid, an acid-resistant material is used to form the transparent protective layer 30, which can well protect the metal underneath from the etching liquid.

Based on the above structure, a touch substrate having a metal bezel can be obtained, and a process for fabricating a touch function layer can be performed on the touch substrate to obtain a complete touch panel.

Figure 3:
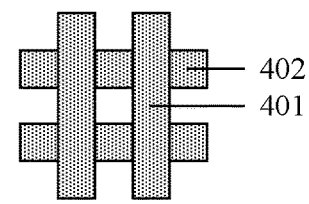
FIG. 3 is a first schematic diagram of a touch function layer according to an exemplary embodiment of the present disclosure.
Figure 3:
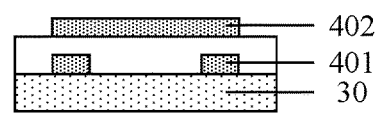
Figure 4:
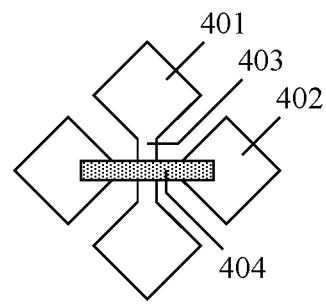
FIG. 4 is a second schematic diagram of a touch function layer according to an exemplary embodiment of the present disclosure.
Figure 4:
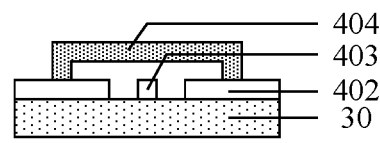
Figure 5:
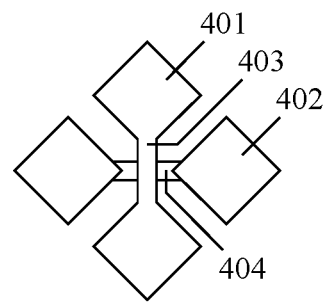
FIG. 5 is a third schematic diagram of a touch function layer according to an exemplary embodiment of the present disclosure.
Figure 5:
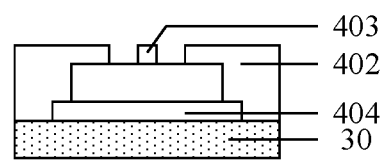

Based on this, as shown in FIG. 3 to FIG. 5, the touch function layer 40 may include a touch electrode located in the display area. The touch electrode may include: a first electrode 401 such as a touch driving electrode arranged in a first direction, for example, a row direction, and a second electrode 402, such as a touch sensing electrode, arranged in a second direction, for example, a column direction, and the first electrode 401 and the second electrode 402 are electrically insulated from each other. It should be noted that the first direction and the second direction may preferably be at an angle of 90° with respect to each other. However, the disclosure is not limited thereto, and the angle between the first electrode 401 and the second electrode 402 may be other angles.

In an embodiment, referring to FIG. 3, the first electrode 401 may be a first strip electrode, and the second electrode 402 may be a second strip electrode. The first strip electrode and the second strip electrode are at an angle of 90° with respect to each other and have an insulating layer disposed therebetween. In the arrangement of the touch electrodes, the first electrode 401 and the second electrode 402 are preferably very thin strip-shaped metal electrodes.

In another embodiment, referring to FIG. 4 and FIG. 5, the first electrode 401 may include a plurality of electrically connected first block electrodes, and adjacent first block electrodes are connected by a conductive strip 403 of an integral form. The second electrode 402 may include a plurality of electrically connected second block electrodes, and adjacent second block electrodes are connected by a conductive bridge 404 at a different layer. The first block electrode and the second block electrode may be disposed in the same layer and an insulating layer disposed between the first block electrode/second block electrode and the conductive bridge 404. That is, the conductive bridge 404 is bridged with the second block electrodes across the insulating layer. The conductive bridge 404 may be a metal conductive bridge or a transparent metal oxide conductive bridge such as an Indium Tin Oxide (ITO) conductive bridge. In the arrangement of the touch electrodes, the first electrode 401 and the second electrode 402 may each be a block-shaped transparent electrode such as an ITO electrode.

Figure 6:
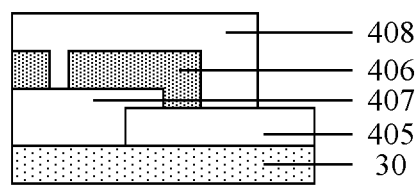
FIG. 6 is a first schematic diagram of a circuit connection structure according to an exemplary embodiment of the present disclosure.
Figure 7:
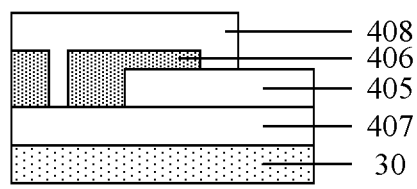
FIG. 7 is a second schematic diagram of a circuit connection structure according to an exemplary embodiment of the present disclosure.

In the above embodiment, as shown in FIG. 6 and FIG. 7, the touch function layer 40 may further include a circuit connection structure located in the non-display area. The circuit connection structure may include a conductive block 405 disposed in the same layer as the first block electrode/second block electrode and formed of the same material as the first block electrode/second block electrode, and a metal wire 406 disposed in the same layer as the conductive bridge 404 and formed of the same material as the conductive bridge 404. The conductive block 405 is in contact with the metal wire 406.

For example, as shown in FIG. 6, the specific arrangement of the circuit connection structure may include: a conductive block 405 is disposed in the same layer as the first block electrode/second block electrode and above the transparent protection layer 30; a first organic transparent insulating layer 407 is disposed above the conductive block 405 and covering a partial area of the conductive block 405; a metal wire 406 is disposed in the same layer as the conductive bridge 404 and above the first organic transparent insulating layer 407, with the metal wire 406 directly lapping on the conductive block 405 in an area of the conductive block 405 not covered by the first organic transparent insulating layer 407; and a second organic transparent insulating layer 408 is further disposed above the metal wire 406. The first organic transparent insulating layer 407 may be disposed in the same layer as the insulating layer between the first block electrode/second block electrode and the conductive bridge 404.

For example, as shown in FIG. 7, the specific arrangement of the circuit connection structure may also include: a first organic transparent insulating layer 407 is disposed above the transparent protection layer 30; a conductive block 405 in the same layer as the first block electrode/second block electrode and a metal wire 406 in the same layer as the conductive bridge 404 are sequentially disposed over the first organic transparent insulating layer 407, with the metal wire 406 directly lapping on the conductive block 405; and a second organic transparent insulating layer 408 is further disposed above the metal wire 406. The first organic transparent insulating layer 407 may be disposed in the same layer as the insulating layer between the first block electrode/second block electrode and the conductive bridge 404.

It should be noted that, in the present exemplary embodiment, the touch function layer 40 may be configured as other structures as needed, as long as the touch function can be implemented, which is not specifically limited herein.

Figure 8:
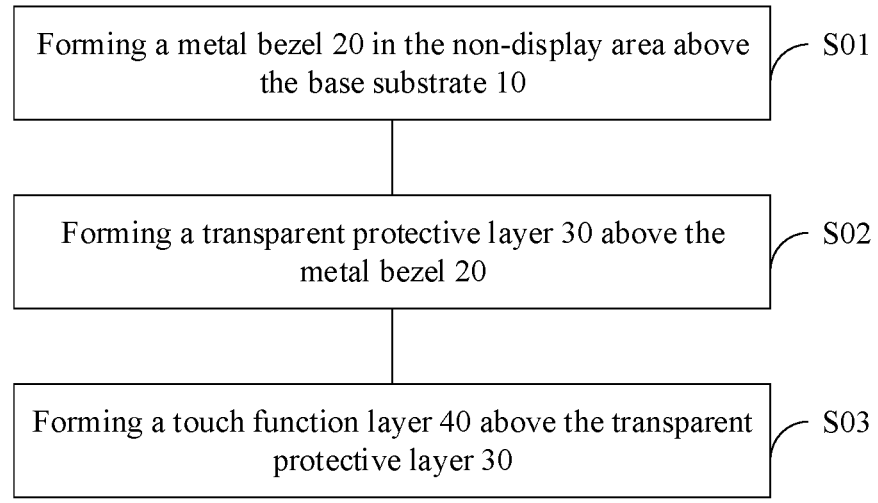
FIG. 8 is a flow chart schematically showing a manufacturing process of a touch panel according to an exemplary embodiment of the present disclosure.

In view of the above touch panel, the present embodiment further provides a method for manufacturing a touch panel. As shown in FIG. 8, the manufacturing method may include the following steps S01-S03.

In step S01, a metal bezel 20 is formed in the non-display area above the base substrate 10.

In step S02, a transparent protective layer 30 is formed above the metal bezel 20.

In step S03, a touch function layer 40 is formed above the transparent protective layer 30.

The side where the base substrate 10 is located is the display side of the touch panel.

The method for manufacturing a touch panel provided by the exemplary embodiment of the present disclosure has good compatibility with a conventional process. In the manufacturing method of the present disclosure, by providing a metal layer as a bezel on the inner surface of the base substrate, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the basis of this, by providing the transparent protective layer above the metal bezel, the metal bezel can be prevented from being eroded by etching liquid, thereby effectively avoiding missing marks required in the subsequent process.

The method for manufacturing the touch panel will be described in detail below with reference to several specific embodiments in conjunction with the accompanying drawings.

Figure 9:
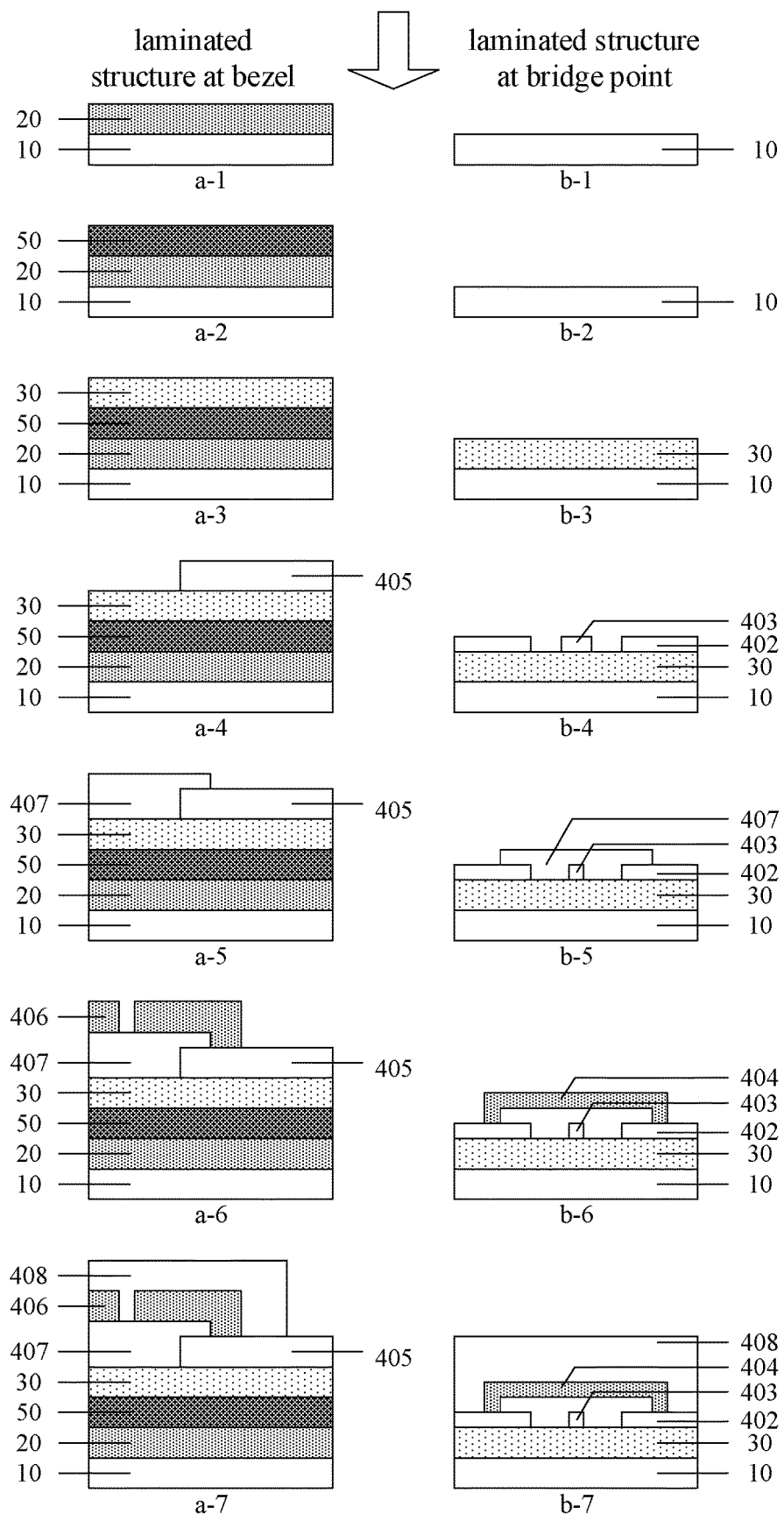
FIG. 9 is a first schematic diagram showing a manufacturing process of a touch panel according to an exemplary embodiment of the present disclosure.

FIG. 9 shows a laminated structure of the touch panel at the bezel and a laminated structure of the touch electrode at the bridge point according to a first embodiment. The touch panel may include a base substrate 10, a metal bezel 20 disposed above the base substrate 10 and located in the non-display area, and a light shielding layer 50 disposed above the metal bezel 20 and having the same pattern as the metal bezel 20, a transparent protective layer 30 disposed above the light shielding layer 50, and a touch function layer 40 disposed above the transparent protective layer 30; wherein the touch function layer 40 includes a touch electrode located in the display area and a circuit connection structure located in the non-display area, and the touch electrode may include a plurality of electrically connected block electrodes.

Based on this, as shown in FIG. 9, the method for manufacturing the touch panel may include the following steps S101-S107.

In step S101, referring to (a-1) and (b-1) of FIG. 9, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S102, referring to (a-2) and (b-2) of FIG. 9, a black photoresist is coated on the substrate on which the metal bezel 20 has been formed. It is exposed to light with a mask, and developed to obtain a light shielding layer 50 of a black BM material in the non-display area. The light shielding layer 50 and the metal bezel 20 together form a composite bezel.

In step S103, referring to (a-3) and (b-3) of FIG. 9, a transparent protective layer 30 is deposited on the substrate on which the light shielding layer 50 has been formed, and the transparent protective layer 30 may include an acid-resistant insulating material such as silicon oxide $SiO_2$ or silicon oxynitride $SiO_xN_y$.

In step S104, referring to (a-4) and (b-4) of FIG. 9, an ITO film is deposited on the substrate on which the transparent protective layer 30 has been formed, and a photoresist is coated over the ITO film. It is exposed to light with a mask, developed and etched to obtain a plurality of first block electrodes electrically connected by the conductive strips 403 and a plurality of independent second block electrodes in the display area, and a conductive block 405 in the non-display area. The conductive strip 403 and the first block electrode form the first electrode 401, to obtain an ITO pattern of the touch electrode. Then the residual photoresist is peeled off.

In step S105, referring to (a-5) and (b-5) of FIG. 9, an organic transparent insulating layer is coated on the substrate on which the ITO pattern has been formed, and it is exposed to light with a mask. After development, a pattern of a first organic transparent insulating layer 407 is obtained. The first organic transparent insulating layer 407 covers above the first electrode 401 in the display area and above a part of the conductive block 405 in the non-display area, to obtain a first insulating layer pattern.

In step S106, referring to (a-6) and (b-6) of FIG. 9, a layer of metal thin film is deposited on the substrate on which the first insulating layer pattern has been formed, and a photoresist is coated on the metal thin film. It is exposed to light with a mask, and developed and etched to obtain a conductive bridge 404 bridging the second block electrodes in the display area, and a metal wire 406 lapping on the conductive block 405 in the non-display area. Thereby, a complete metal trace and bridge pattern. Then, the residual photoresist is peeled off.

In step S107, referring to (a-7) and (b-7) of FIG. 9, an organic transparent insulating layer is coated on the substrate on which the metal trace and bridge pattern has been formed, and it is exposed and developed to obtain a second organic transparent insulating layer 408 covering the conductive bridge 404 and the metal wire 406. In one embodiment of the present disclosure, other processes may also be employed. For example, organic transparent insulating material may be directly coated (or deposited) to form the second organic transparent insulating layer 408.

Based on the above steps S101-S107, the desired touch panel can be obtained through several patterning processes. By providing a metal layer as a bezel on the inner surface of the base substrate, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the basis of this, by providing the transparent protective layer 30 above the metal bezel 20, the metal bezel 20 can be prevented from being eroded by etching liquid, thereby effectively avoiding missing marks required in the subsequent process.

It should be noted that the patterning process refers to a whole process of coating a photoresist layer on a substrate or other film layer in order to obtain a patterned film layer, exposing it with a mask, developing and etching it to obtain a desired pattern, and optionally peeling off the photoresist.

Figure 10:
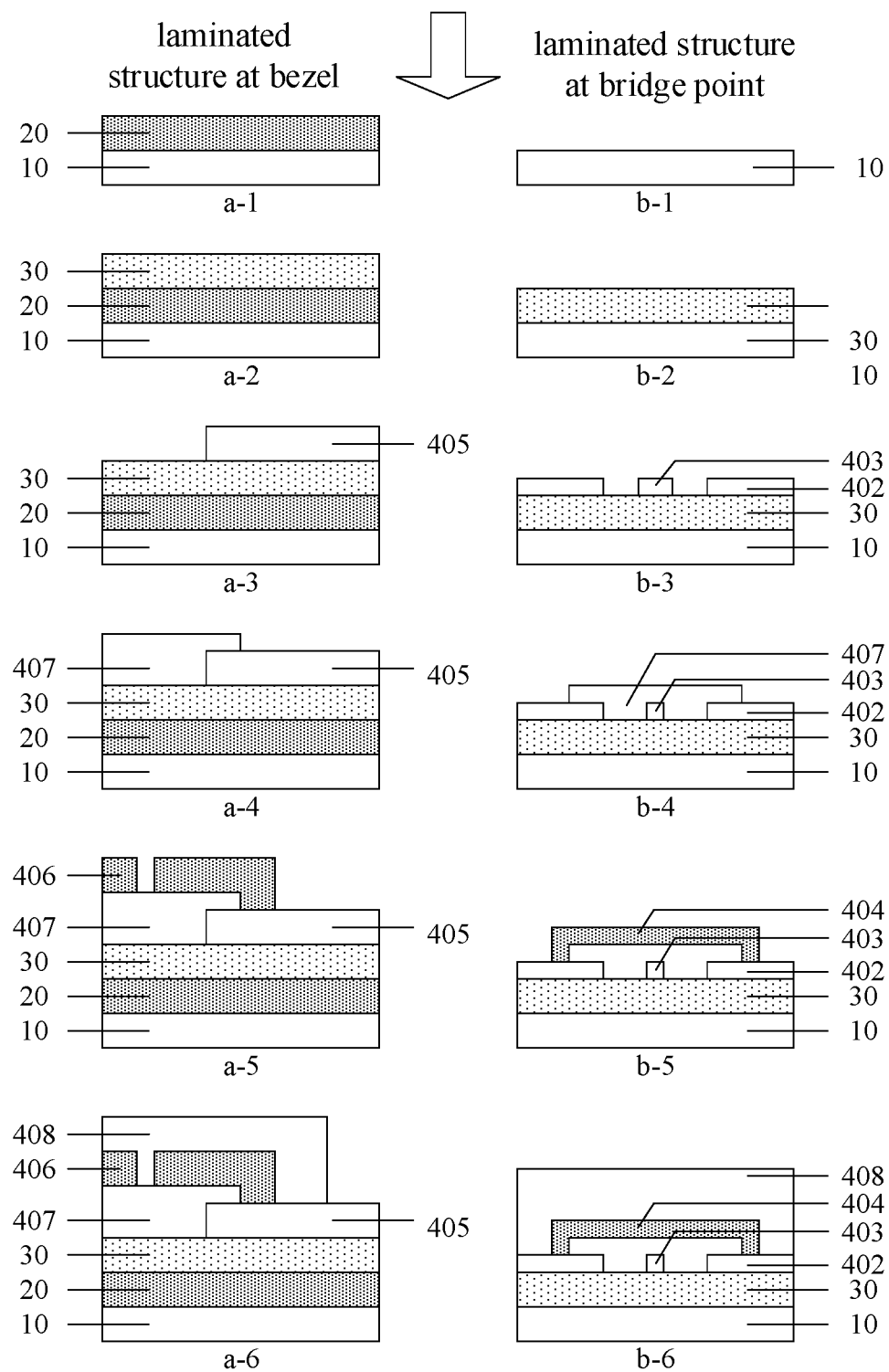
FIG. 10 is a second schematic diagram showing a manufacturing process of a touch panel according to an exemplary embodiment of the present disclosure.

FIG. 10 shows a laminated structure of the touch panel at the bezel and a laminated structure of the touch electrode at the bridge point according to a second embodiment. The touch panel may include a base substrate 10, a metal bezel 20 disposed above the base substrate 10 and located in the non-display area, and a transparent protective layer 30 disposed above the metal bezel 20, and a touch function layer 40 disposed above the transparent protective layer 30; wherein the touch function layer 40 includes a touch electrode located in the display area and a circuit connection structure located in the non-display area, and the touch electrode may include a plurality of electrically connected block electrodes.

Based on this, as shown in FIG. 10, the method for manufacturing the touch panel may include the following steps S201-S206.

In step S201, referring to (a-1) and (b-1) of FIG. 10, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S202, referring to (a-2) and (b-2) of FIG. 10, a transparent protective layer 30 is deposited on the substrate on which the metal bezel 20 has been formed, and the transparent protective layer 30 may include an acid-resistant insulating material such as silicon oxide $SiO_2$ or silicon oxynitride $SiO_xN_y$.

In step S203, referring to (a-3) and (b-3) of FIG. 10, an ITO film is deposited on the substrate on which the transparent protective layer 30 has been formed, and a photoresist is coated over the ITO film. It is exposed to light with a mask, developed and etched to obtain a plurality of first block electrodes electrically connected by the conductive strips 403 and a plurality of independent second block electrodes in the display area, and a conductive block 405 in the non-display area. The conductive strip 403 and the first block electrode form the first electrode 401, to obtain an ITO pattern of the touch electrode. Then the residual photoresist is peeled off.

In step S204, referring to (a-4) and (b-4) of FIG. 10, an organic transparent insulating layer is coated on the substrate on which the ITO pattern has been formed, and it is exposed to light with a mask. After development, a pattern of a first organic transparent insulating layer 407 is obtained. The first organic transparent insulating layer 407 covers above the first electrode 401 in the display area and above a part of the conductive block 405 in the non-display area, to obtain a first insulating layer pattern.

In step S205, referring to (a-5) and (b-5) of FIG. 10, a layer of metal thin film is deposited on the substrate on which the first insulating layer pattern has been formed, and a photoresist is coated on the metal thin film. It is exposed to light with a mask, and developed and etched to obtain a conductive bridge 404 bridging the second block electrodes in the display area, and a metal wire 406 lapping on the conductive block 405 in the non-display area. Thereby, a complete metal trace and bridge pattern. Then, the residual photoresist is peeled off.

In step S206, referring to (a-6) and (b-6) of FIG. 10, an organic transparent insulating layer is coated on the substrate on which the metal trace and bridge pattern has been formed, and it is exposed and developed to obtain a second organic transparent insulating layer 408 covering the conductive bridge 404 and the metal wire 406. In one embodiment of the present disclosure, other processes may also be employed. For example, organic transparent insulating material may be directly coated (or deposited) to form the second organic transparent insulating layer 408.

Based on the above steps S201-S206, the desired touch panel can be obtained through several patterning processes. Comparing to the touch panel obtained in the above embodiment, in the touch panel obtained in the present embodiment, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the yet another hand, by eliminating the light shielding layer 50, no black contour will appear at the edge climbing position, and a perfect pure metal bezel can be realized, thereby satisfying the user's demand for visual aesthetics of the product.

Figure 11:
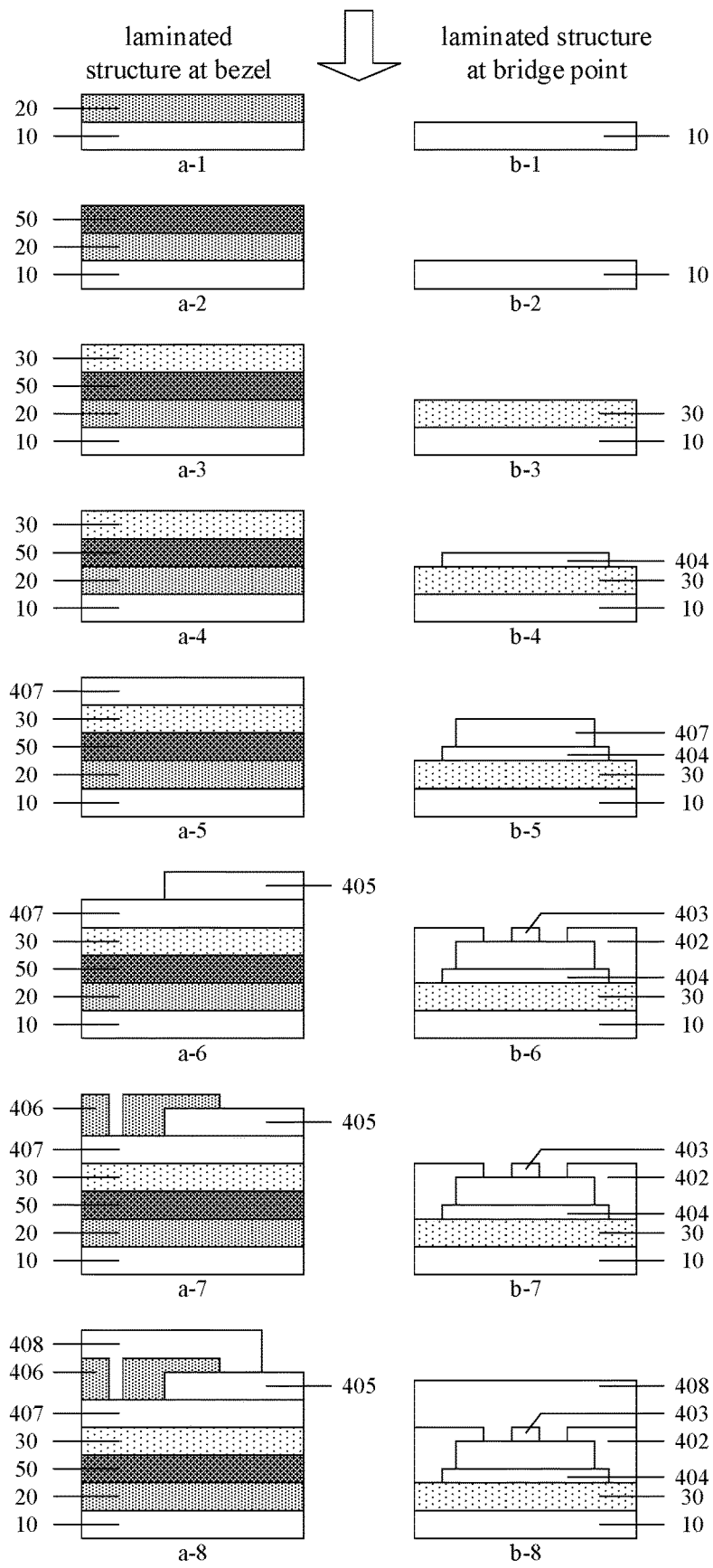
FIG. 11 is a third schematic diagram showing a manufacturing process of a touch panel according to an exemplary embodiment of the present disclosure.

FIG. 11 shows a laminated structure of the touch panel at the bezel and a laminated structure of the touch electrode at the bridge point according to a third embodiment. The touch panel may include a base substrate 10, a metal bezel 20 disposed above the base substrate 10 and located in the non-display area, and a light shielding layer 50 disposed above the metal bezel 20 and having the same pattern as the metal bezel 20, a transparent protective layer 30 disposed above the light shielding layer 50, and a touch function layer 40 disposed above the transparent protective layer 30; wherein the touch function layer 40 includes a touch electrode located in the display area and a circuit connection structure located in the non-display area, and the touch electrode may include a plurality of electrically connected block electrodes.

Based on this, as shown in FIG. 11, the method for manufacturing the touch panel may include the following steps S301-S308.

In step S301, referring to (a-1) and (b-1) of FIG. 11, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S302, referring to (a-2) and (b-2) of FIG. 11, a black photoresist is coated on the substrate on which the metal bezel 20 has been formed. It is exposed to light with a mask, and developed to obtain a light shielding layer 50 of a black BM in the non-display area. The light shielding layer 50 and the metal bezel 20 together form a composite bezel.

In step S303, referring to (a-3) and (b-3) of FIG. 11, a transparent protective layer 30 is deposited on the substrate on which the light shielding layer 50 has been formed, and the transparent protective layer 30 may include an acid-resistant insulating material such as silicon oxide $SiO_2$ or silicon oxynitride $SiO_xN_y$.

In step S304, referring to (a-4) and (b-4) of FIG. 11, an ITO film is deposited on the substrate on which the transparent protective layer 30 has been formed, and a photoresist is coated over the ITO film. It is exposed to light with a mask, developed and etched to obtain a conductive bridge 404 for bridging the second block electrodes. Then the residual photoresist is peeled off.

In step S305, referring to (a-5) and (b-5) of FIG. 11, an organic transparent insulating layer is coated on the substrate on which the conductive bridge 404 has been formed, and it is exposed to light with a mask. After development, a first organic transparent insulating layer 407 is obtained. The first organic transparent insulating layer 407 covers above part of the conductive bridge 404 in the display area and above the transparent protective layer 30 in the non-display area, to obtain a first insulating layer pattern.

In step S306, referring to (a-6) and (b-6) of FIG. 11, an ITO film is deposited on the substrate on which the first insulating layer pattern has been formed, and a photoresist is coated on the ITO film. It is exposed to light with a mask, and developed and etched to obtain a plurality of first block electrodes electrically connected by the conductive strips 403 and a plurality of second block electrodes in contact with the conductive bridges 404 in the display area, and to obtain a conductive block 405 in the non-display area. The conductive strips 403 and the first block electrodes form the first electrode 401, and the conductive bridges 404 and the second block electrodes form the second electrode 402. Thereby, an ITO pattern of the touch electrode is obtained. Then, the residual photoresist is peeled off.

In step S307, referring to (a-7) and (b-7) of FIG. 11, a layer of metal thin film is deposited on the substrate on which the ITO pattern has been formed, and a photoresist is coated on the metal thin film. It is exposed to light with a mask, and developed and etched to obtain a metal wire 406 lapping on the conductive block 405 in the non-display area. Thereby, a complete metal trace pattern. Then, the residual photoresist is peeled off.

In step S308, referring to (a-8) and (b-8) of FIG. 11, an organic transparent insulating layer is coated on the substrate on which the metal trace pattern has been formed, and it is exposed and developed to obtain a second organic transparent insulating layer 408 covering the first block electrode, the second block electrode, the conductive strip 403 and the metal wire 406. In one embodiment of the present disclosure, other processes may also be employed. For example, organic transparent insulating material may be directly coated (or deposited) to form the second organic transparent insulating layer 408.

Based on the above steps S301-S308, the desired touch panel can be obtained through several patterning processes. By providing a metal layer as a bezel on the inner surface of the base substrate, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the basis of this, by providing the transparent protective layer 30 above the metal bezel 20, the metal bezel 20 can be prevented from being eroded by etching liquid, thereby effectively avoiding missing marks required in the subsequent process.

Figure 12:
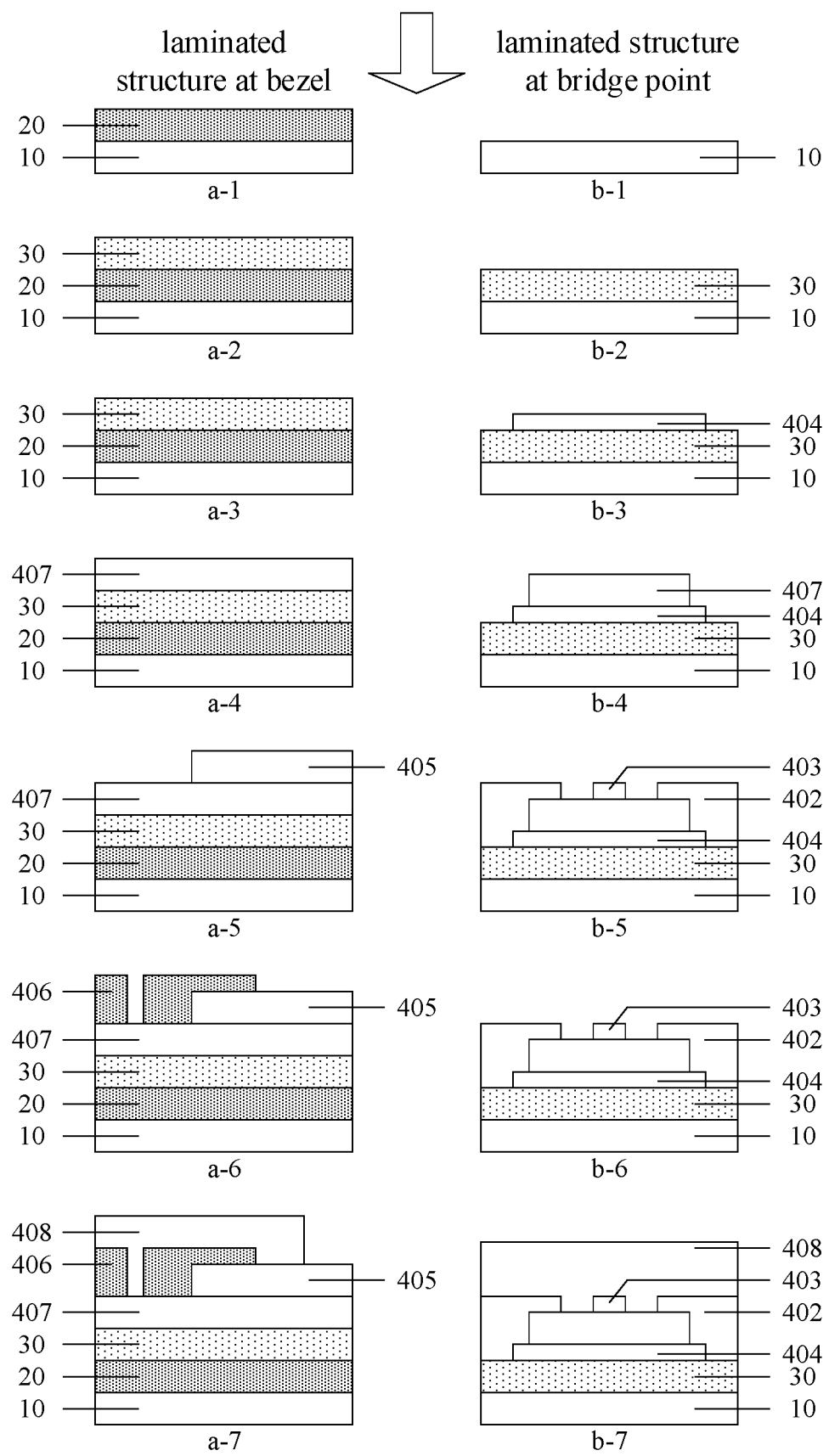
FIG. 12 is a fourth schematic diagram showing a manufacturing process of a touch panel according to an exemplary embodiment of the present disclosure.

FIG. 12 shows a laminated structure of the touch panel at the bezel and a laminated structure of the touch electrode at the bridge point according to a fourth embodiment. The touch panel may include a base substrate 10, a metal bezel 20 disposed above the base substrate 10 and located in the non-display area, and a transparent protective layer 30 disposed above the metal bezel 20, and a touch function layer 40 disposed above the transparent protective layer 30; wherein the touch function layer 40 includes a touch electrode located in the display area and a circuit connection structure located in the non-display area, and the touch electrode may include a plurality of electrically connected block electrodes.

Based on this, as shown in FIG. 12, the method for manufacturing the touch panel may include the following steps S401-S408.

In step S401, referring to (a-1) and (b-1) of FIG. 12, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S402, referring to (a-2) and (b-2) of FIG. 12, a transparent protective layer 30 is deposited on the substrate on which the metal bezel 20 has been formed, and the transparent protective layer 30 may include an acid-resistant insulating material such as silicon oxide $SiO_2$ or silicon oxynitride $SiO_xN_y$.

In step S403, referring to (a-3) and (b-3) of FIG. 12, an ITO film is deposited on the substrate on which the transparent protective layer 30 has been formed, and a photoresist is coated over the ITO film. It is exposed to light with a mask, developed and etched to obtain a conductive bridge 404 for bridging the second block electrodes. Then the residual photoresist is peeled off.

In step S404, referring to (a-4) and (b-4) of FIG. 12, an organic transparent insulating layer is coated on the substrate on which the conductive bridge 404 has been formed, and it is exposed to light with a mask. After development, a first organic transparent insulating layer 407 is obtained. The first organic transparent insulating layer 407 covers above part of the conductive bridge 404 in the display area and above the transparent protective layer 30 in the non-display area, to obtain a first insulating layer pattern.

In step S405, referring to (a-5) and (b-5) of FIG. 12, an ITO film is deposited on the substrate on which the first insulating layer pattern has been formed, and a photoresist is coated on the ITO film. It is exposed to light with a mask, and developed and etched to obtain a plurality of first block electrodes electrically connected by the conductive strips 403 and a plurality of second block electrodes in contact with the conductive bridges 404 in the display area, and to obtain a conductive block 405 in the non-display area. The conductive strips 403 and the first block electrodes form the first electrode 401, and the conductive bridges 404 and the second block electrodes form the second electrode 402. Thereby, an ITO pattern of the touch electrode is obtained. Then, the residual photoresist is peeled off.

In step S406, referring to (a-6) and (b-6) of FIG. 12, a layer of metal thin film is deposited on the substrate on which the ITO pattern has been formed, and a photoresist is coated on the metal thin film. It is exposed to light with a mask, and developed and etched to obtain a metal wire 406 lapping on the conductive block 405 in the non-display area. Thereby, a complete metal trace pattern. Then, the residual photoresist is peeled off.

In step S407, referring to (a-7) and (b-7) of FIG. 12, an organic transparent insulating layer is coated on the substrate on which the metal trace pattern has been formed, and it is exposed and developed to obtain a second organic transparent insulating layer 408 covering the first block electrode, the second block electrode, the conductive strip 403 and the metal wire 406. In one embodiment of the present disclosure, other processes may also be employed. For example, organic transparent insulating material may be directly coated (or deposited) to form the second organic transparent insulating layer 408.

Based on the above steps S401-S407, the desired touch panel can be obtained through several patterning processes. Comparing to the touch panel obtained in the above embodiment, in the touch panel obtained in the present embodiment, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the yet another hand, by eliminating the light shielding layer 50, no black contour will appear at the edge climbing position, and a perfect pure metal bezel can be realized, thereby satisfying the user's demand for visual aesthetics of the product.

Figure 13:
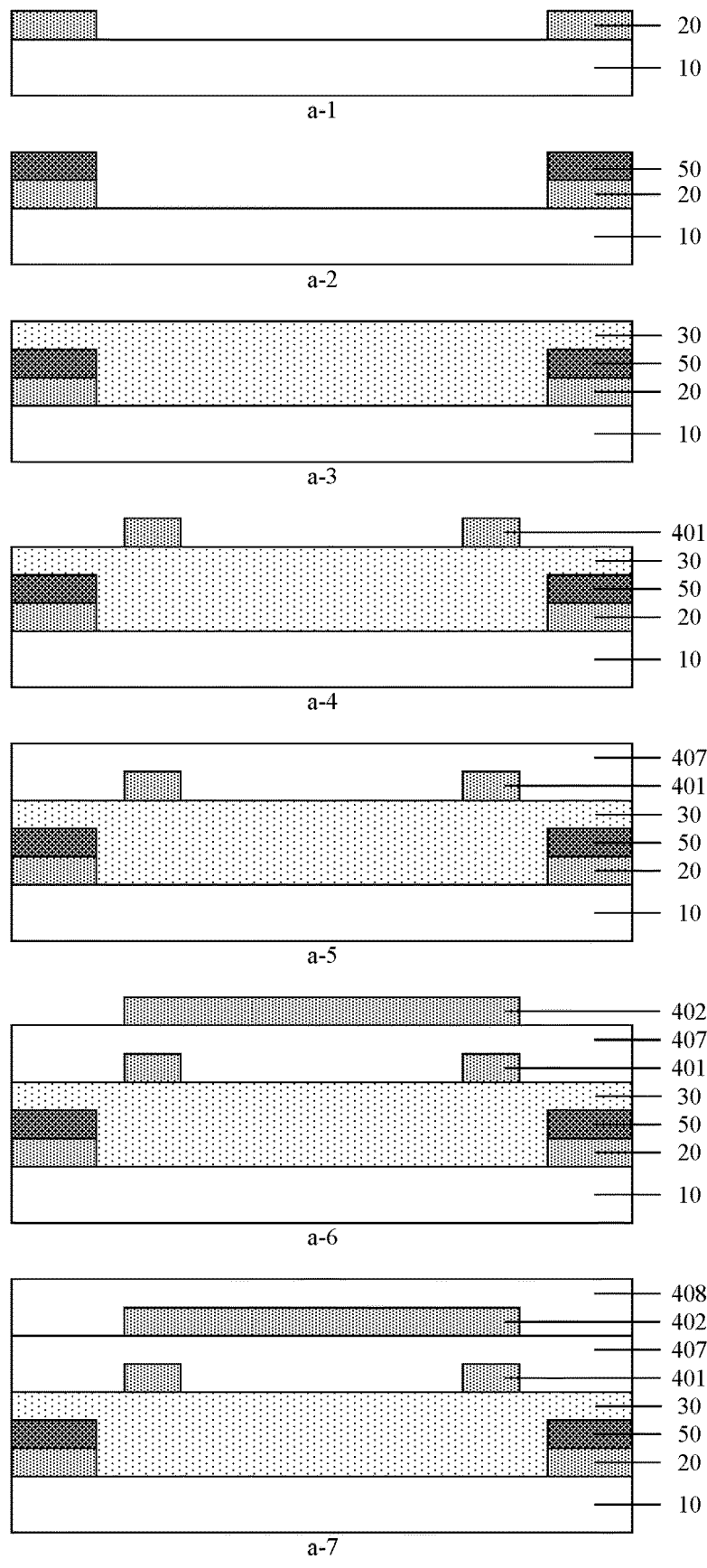
FIG. 13 is a fifth schematic diagram showing a manufacturing process of a touch panel according to an exemplary embodiment of the present disclosure.

FIG. 13 shows a laminated structure of the touch panel at the bezel and a laminated structure of the touch electrode at the bridge point according to a fifth embodiment. The touch panel may include a base substrate 10, a metal bezel 20 disposed above the base substrate 10 and located in the non-display area, and a light shielding layer 50 disposed above the metal bezel 20 and having the same pattern as the metal bezel 20, a transparent protective layer 30 disposed above the light shielding layer 50, and a touch function layer 40 disposed above the transparent protective layer 30; wherein the touch function layer 40 includes a touch electrode located in the display area, and the touch electrode may include a plurality of horizontal strip electrodes and a plurality of longitudinal strip electrodes intersecting with each other.

Based on this, as shown in FIG. 13, the method for manufacturing the touch panel may include the following steps S501-S507.

In step S501, referring to (a-1) of FIG. 13, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S502, referring to (a-2) of FIG. 13, a black photoresist is coated on the substrate on which the metal bezel 20 has been formed. It is exposed to light with a mask, and developed to obtain a light shielding layer 50 of a black BM in the non-display area. The light shielding layer 50 and the metal bezel 20 together form a composite bezel.

In step S503, referring to (a-3) of FIG. 13, a transparent protective layer 30 is deposited on the substrate on which the light shielding layer 50 has been formed, and the transparent protective layer 30 may include an acid-resistant insulating material such as silicon oxide $SiO_2$ or silicon oxynitride $SiO_xN_y$.

In step S504, referring to (a-4) of FIG. 13, a metal film is deposited on the substrate on which the transparent protective layer 30 has been formed, and a photoresist is coated over the metal film. It is exposed to light with a mask, developed and etched to obtain a plurality of first electrodes 401 such as a first strip electrodes disposed in a second direction such as a column direction. Then the residual photoresist is peeled off.

In step S505, referring to (a-5) of FIG. 13, an organic transparent insulating layer is coated on the substrate on which the first electrodes 401 have been formed, and it is exposed to light with a mask. After development, a first organic transparent insulating layer 407 is obtained.

In step S506, referring to (a-6) of FIG. 13, a layer of metal thin film is deposited on the substrate on which the first organic transparent insulating layer 407 has been formed, and a photoresist is coated on the metal thin film. It is exposed to light with a mask, and developed and etched to obtain a plurality of second electrodes 402 such as a second strip electrodes disposed in a first direction such as a row direction. Then, the residual photoresist is peeled off.

In step S507, referring to (a-7) of FIG. 13, an organic transparent insulating layer is coated on the substrate on which the second electrodes 402 have been formed, and it is exposed to light with a mask. After development, a second organic transparent insulating layer 408 is obtained. In one embodiment of the present disclosure, other processes may also be employed. For example, organic transparent insulating material may be directly coated (or deposited) to form the second organic transparent insulating layer 408.

Based on the above steps S501-S507, the desired touch panel can be obtained through several patterning processes. By providing a metal layer as a bezel on the inner surface of the base substrate, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the basis of this, by providing the transparent protective layer 30 above the metal bezel 20, the metal bezel 20 can be prevented from being eroded by etching liquid, thereby effectively avoiding missing marks required in the subsequent process.

Figure 14:
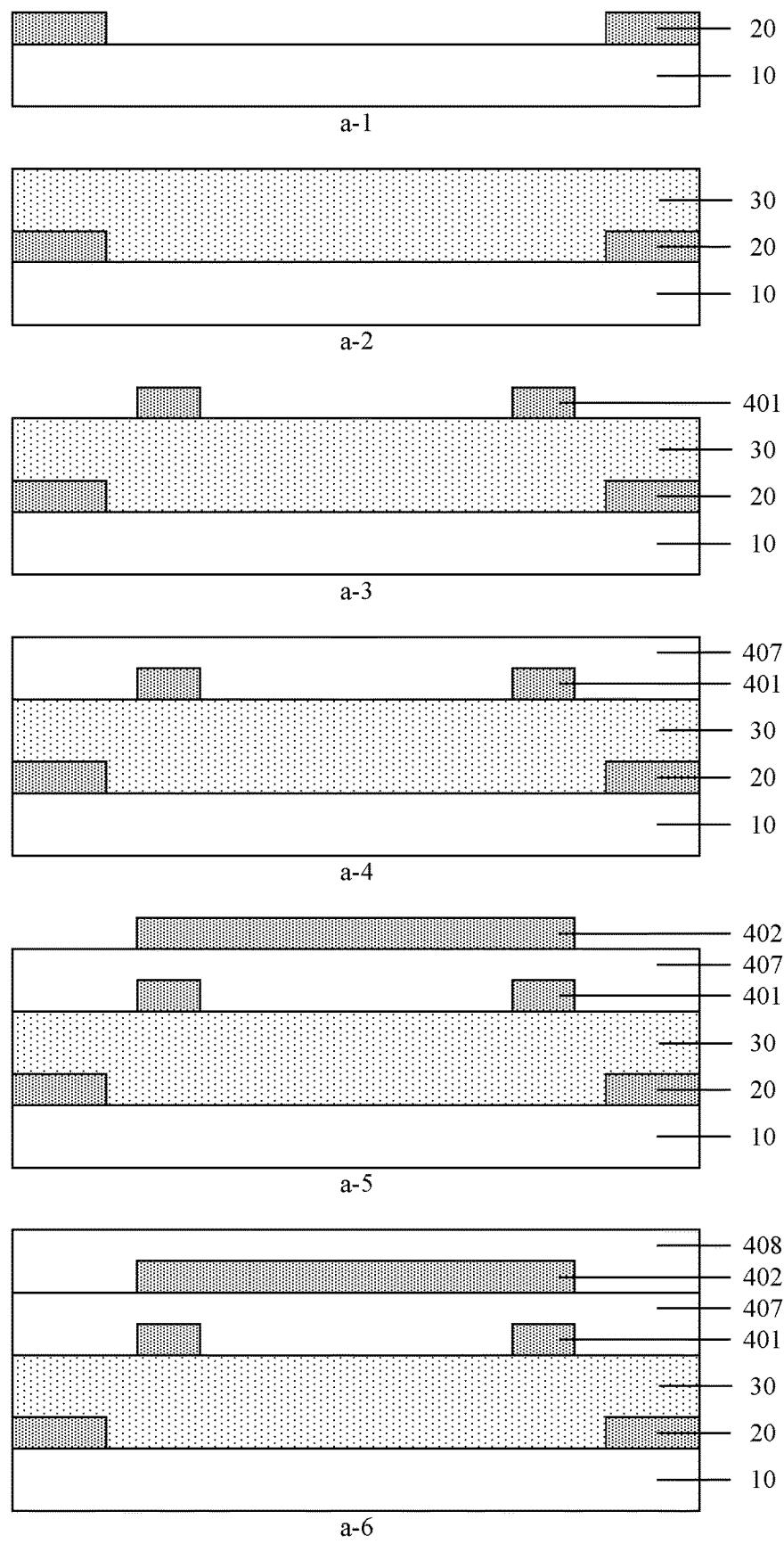
FIG. 14 is a sixth schematic diagram showing a manufacturing process of a touch panel according to an exemplary embodiment of the present disclosure.

FIG. 14 shows a laminated structure of the touch panel at the bezel and a laminated structure of the touch electrode at the bridge point according to a sixth embodiment. The touch panel may include a base substrate 10, a metal bezel 20 disposed above the base substrate 10 and located in the non-display area, and a transparent protective layer 30 disposed above the metal bezel 20, and a touch function layer 40 disposed above the transparent protective layer 30; wherein the touch function layer 40 includes a touch electrode located in the display area, and the touch electrode may include a plurality of horizontal strip electrodes and a plurality of longitudinal strip electrodes intersecting with each other.

Based on this, as shown in FIG. 14, the method for manufacturing the touch panel may include the following steps S601-S607.

In step S601, referring to (a-1) of FIG. 14, a metal layer is deposited on a surface of a cleaned glass substrate or a cleaned transparent film, and a photoresist is coated on the metal layer. It is exposed to light with a mask, and developed and etched to obtain a desired metal bezel 20 in the non-display area. Then the residual photoresist is peeled off. The metal layer may include an alloy of combination of any one or more of copper, aluminum, silver, and molybdenum.

In step S602, referring to (a-2) of FIG. 14, a transparent protective layer 30 is deposited on the substrate on which the metal bezel 20 has been formed, and the transparent protective layer 30 may include an acid-resistant insulating material such as silicon oxide $SiO_2$ or silicon oxynitride $SiO_xN_y$.

In step S603, referring to (a-3) of FIG. 14, a metal film is deposited on the substrate on which the transparent protective layer 30 has been formed, and a photoresist is coated over the metal film. It is exposed to light with a mask, developed and etched to obtain a plurality of first electrodes 401 such as a first strip electrodes disposed in a second direction such as a column direction. Then the residual photoresist is peeled off.

In step S604, referring to (a-4) of FIG. 14, an organic transparent insulating layer is coated on the substrate on which the first electrodes 401 have been formed, and it is exposed to light with a mask. After development, a first organic transparent insulating layer 407 is obtained.

In step S605, referring to (a-5) of FIG. 14, a layer of metal thin film is deposited on the substrate on which the first organic transparent insulating layer 407 has been formed, and a photoresist is coated on the metal thin film. It is exposed to light with a mask, and developed and etched to obtain a plurality of second electrodes 402 such as a second strip electrodes disposed in a first direction such as a row direction. Then, the residual photoresist is peeled off.

In step S606, referring to (a-6) of FIG. 14, an organic transparent insulating layer is coated on the substrate on which the second electrodes 402 have been formed, and it is exposed to light with a mask. After development, a second organic transparent insulating layer 408 is obtained. In one embodiment of the present disclosure, other processes may also be employed. For example, organic transparent insulating material may be directly coated (or deposited) to form the second organic transparent insulating layer 408.

Based on the above steps S601-S606, the desired touch panel can be obtained through several patterning processes. Comparing to the touch panel obtained in the above embodiment, in the touch panel obtained in the present embodiment, on the one hand, it can effectively solve the poor adhesion of the traditional bezel in the UV resistance test, thereby improving the performance of the product; on the other hand, since the color of the metal can be rich and not monotonous, it can realize bezel design with metallic luster and various colors to meet the demands of consumers and enhance the competitiveness of products. On the yet another hand, by eliminating the light shielding layer 50, no black contour will appear at the edge climbing position, and a perfect pure metal bezel can be realized, thereby satisfying the user's demand for visual aesthetics of the product.

The various embodiments described above are the preferred embodiments of the present disclosure, and are not intended to limit the scope of the present disclosure. Any modifications, equivalents, or improvements made within the spirit and principles of the present disclosure should be encompassed within the scope of protection of the present disclosure.

It should be noted that the specific details of the method for manufacturing the touch panel have been described in detail in the corresponding touch panel, and details are not described herein again.

An exemplary embodiment of the present disclosure further provides a display device including the above touch panel, a display module, a driving circuit, and a flexible circuit board.

After the touch panel provided in the embodiment is bonded to the display module, the driving circuit, and the flexible circuit board, the touch display device having the metal bezel can be obtained.

It should be noted that the display device may include any product or component having a display function, such as a mobile phone, a tablet computer, a television, a notebook computer, a digital photo frame, a navigator, etc., which is not specifically limited in the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A touch panel comprising a display area and a non-display area;
and the touch panel further comprising:
a base substrate;
a metal bezel disposed directly above the base substrate in a first direction of the touch panel and located in the non-display area, the first direction being a direction away from the base substrate from an upper side of the base substrate;
a transparent protective layer disposed directly above the metal bezel in the first direction; and
a touch function layer disposed directly above the transparent protective layer in the first direction;

wherein a side of the touch panel where the base substrate is located is a display side of the touch panel.

2. The touch panel of claim 1, further comprising:
a light shielding layer disposed on a side of the metal bezel facing away from the base substrate;
wherein an orthographic projection of the light shielding layer on the base substrate coincides with an orthographic projection of the metal bezel on the base substrate.

3. The touch panel of claim 1, wherein a material for forming the metal bezel comprises one or more of copper, aluminum, gold, silver, and molybdenum.

4. The touch panel of claim 1, wherein a material for forming the transparent protective layer comprises an acid resistant insulating material.

5. The touch panel of claim 1, wherein the touch function layer comprises a touch electrode located in the display area;
the touch electrode comprises a first electrode arranged in a first direction and a second electrode arranged in a second direction, and the first electrode and the second electrode are electrically insulated from each other; and
wherein the first direction and the second direction are at an angle of about 60°-90° with respect to each other.

6. The touch panel of claim 5, wherein the first electrode comprises a plurality of electrically connected first block electrodes, and adjacent first block electrodes are connected by a conductive strip of an integral form;
the second electrode comprises a plurality of electrically connected second block electrodes, and adjacent second block electrodes are connected by a conductive bridge at a different layer; and
the first block electrode and the second block electrode are disposed in the same layer, and an insulating layer is further disposed between the first and second block electrodes and the conductive bridge.

7. The touch panel of claim 6, wherein the touch function layer further comprises a circuit connection structure located in the non-display area; and
the circuit connection structure comprises a conductive block disposed in the same layer as the second block electrode and formed of a same material as the second block electrode, and a metal wire electrically connected to the conductive block.

8. The touch panel according to claim 7, wherein the metal wire is disposed in a same layer as the conductive bridge and is formed of a same material as the conductive bridge.

9. The touch panel of claim 5, wherein the first electrode is a first strip electrode, the second electrode is a second strip electrode, and an insulating layer is disposed between the first strip electrode and the second strip electrode.

10. The touch panel of claim 1, wherein the base substrate comprises a glass substrate or a flexible substrate.

11. A display device comprising the touch panel of claim 1 and a display module.

12. A method for manufacturing a touch panel, comprising:
forming a metal bezel on a non-display area directly above a base substrate in a first direction of the touch panel, the first direction being a direction away from the base substrate from an upper side of the base substrate;
forming a transparent protective layer directly above the metal bezel in the first direction; and
forming a touch function layer directly above the transparent protective layer in the first direction;
wherein a side of the touch panel where the base substrate is located is a display side of the touch panel.

13. The method of claim 12, further comprising:
depositing a metal layer on the substrate; and
patterning the metal layer to obtain a desired metal bezel,
wherein the metal layer comprises an alloy of a combination of any one or more of copper, aluminum, silver, and molybdenum.

14. The method of claim 13, further comprising:
coating a layer of black photoresist on the substrate formed with the metal bezel; and
patterning the black photoresist to obtain a light shielding layer, wherein the light shielding layer and the metal bezel together form a composite bezel.

15. The method of claim 14, further comprising:
depositing a transparent protective layer on the substrate on which the light shielding layer has been formed, and the transparent protective layer comprises an acid resistant insulating material.

16. The method of claim 15, further comprising:
depositing a transparent conductive film on the substrate on which the transparent protective layer has been formed; and
patterning the transparent conductive film to obtain a plurality of first block electrodes electrically connected by conductive strips and a plurality of independent second block electrodes in a display area, and to obtain a conductive block in the non-display area,
wherein the conductive strip and the first block electrode form the first electrode, thereby obtaining a transparent conductive pattern of a touch electrode.

17. The method of claim 16, further comprising:
coating an organic transparent insulating layer on the substrate on which the transparent conductive pattern has been formed; and
patterning the organic transparent insulating layer to obtain a pattern of a first organic transparent insulating layer, wherein the first organic transparent insulating layer is covered above the first electrode in the display area and above a part of the conductive block in the non-display area, to obtain a first insulating layer pattern.

18. The method of claim 17, further comprising:
depositing a metal film on the substrate on which the first insulating layer pattern has been formed; and
patterning the metal film to obtain a conductive bridge bridging the second block electrodes in the display area, and to obtain a metal wire lapping on the conductive block in the non-display area, thereby obtaining a complete metal trace and bridge pattern.

19. The method of claim 18, further comprising:
coating a second organic transparent insulating layer on the substrate on which the metal trace and the bridge pattern has been formed; and
patterning the second organic transparent insulating layer to obtain a second organic transparent insulating layer covering the conductive bridge and the metal wire.

20. The method of claim 12, wherein the base substrate comprises a glass substrate or a flexible substrate.

* * * * *